United States Patent [19]
Moulin et al.

[11] 3,754,109
[45] Aug. 21, 1973

[54] BRAZING PRESS PARTICULARLY FOR BRAZING A PRESSING INCLUDING CURVED PORTIONS TO A MATCHING PLATE

[75] Inventors: Jean Moulin; Bernard Dallet, Massy, France

[73] Assignee: Societe De Traitements Electrolytiques Et Electrothermiques (Stel)

[22] Filed: Aug. 16, 1972

[21] Appl. No.: 281,763

[52] U.S. Cl. ............ 219/9.5, 219/10.49, 219/10.67, 219/10.79
[51] Int. Cl. .......................................... H05b 5/00
[58] Field of Search................... 219/10.49, 6.5, 9.5, 219/10.67, 10.79, 85

[56] References Cited
UNITED STATES PATENTS

| | | | |
|---|---|---|---|
| 3,609,277 | 9/1971 | Dallet et al. | 219/6.5 |
| 3,214,560 | 10/1965 | Laughlin | 219/9.5 |
| 3,632,948 | 1/1972 | Moulin et al. | 219/10.79 |
| 3,646,304 | 2/1972 | Dallet et al. | 219/6.5 |
| 3,650,710 | 3/1972 | Doucerain | 219/9.5 |

*Primary Examiner*—J. V. Truhe
*Assistant Examiner*—B. A. Reynolds
*Attorney*—John W. Malley, G. Lloyd Knight et al.

[57] ABSTRACT

Brazing press for joining pressings having a bottom and a sidewall and curved portions connecting the former two, such as bottoms of shaped cooking utensils, pots or pans, to a matching heat diffuser plate of a heat conducting metal covering at least part of the curved portions. Such a press includes : a main inductor ; a ferromagnetic susceptor device interposed between the inductor and the diffuser plate for heating said latter and including a flat central portion and an annular peripheral portion matching the outer edge of the diffuser plate ; a supplementary inductor for heating the annular susceptor portion and means for exerting pressure on the edge of the sidewall to make the curved portions bulge so as to flatten them against the matching portions of the diffuser plate during the brazing operation.

14 Claims, 7 Drawing Figures

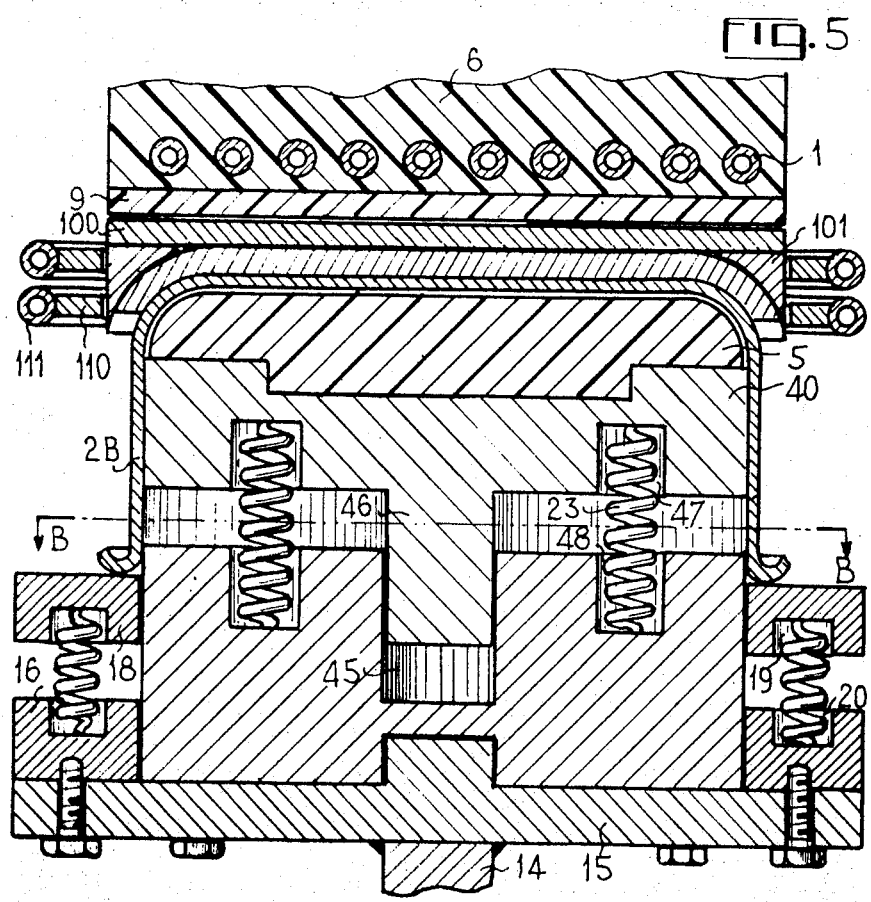
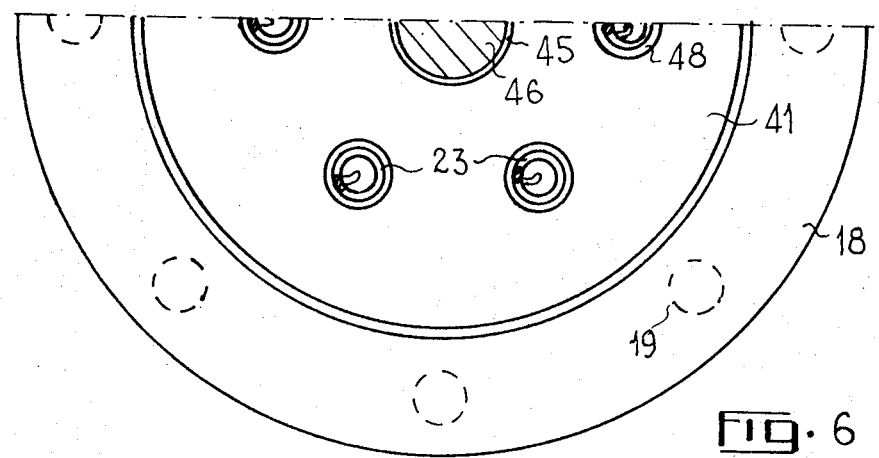

3,754,109

BRAZING PRESS PARTICULARLY FOR BRAZING A PRESSING INCLUDING CURVED PORTIONS TO A MATCHING PLATE

The present invention relates to brazing presses for brazing together two or more metal plates in order to produce a stratified metal structure, and relates more particularly to presses for brazing to a first component which comprises, on the one hand, flat parts and, on the other, curved or raised parts, a second component one of whose faces presents shapes which match those of the first.

Brazing presses of this kind are generally utilized in the manufacture of cooking vessels where it is advantageous to attach to a pressing of stainless steel, for example, comprising a flat base and raised, curved walls, a heat-diffusing bottom made of a metal having good thermal conductivity, such as copper, aluminum or alloys thereof.

In U.S. Pat. No. 3,609,277 filed July 13, 1970, there was described and illustrated in FIG. 1, a brazing press for attaching to a pressing with raised walls, a preformed diffuser bottom whose face disposed towards the pressing likewise having raised edges matching the shape of the pressing. This brazing is carried out in this case by means of an intermediate component of ferromagnetic material, or "susceptor," which has a special shape, that is to say it comprises a thin central portion, slightly concave, and raised edges of substantial thickness, whose face opposite the diffuser bottom being matched to the final external form the latter is to have after brazing to the pressing. The pressure exerted by the press on the edges of the susceptor causes them to pivot slightly (due to the concavity) in relation to its center and, consequently, firmly flattens the raised edges of the diffuser bottom against the corresponding parts of the pressing. To carry out brazing of these curved peripheral parts, this press furthermore comprises a supplementary inductor surrounding the raised edges of the susceptor.

Experience has shown that after a certain number of pressing and heating operations, the thus designed susceptor looses the concavity at its central area and it is necessary to withdraw it from the press and to restore it to the correct shape for example by applying a pressure to its centre, so that the production process has to be interrupted for the time which is required to replace it by another one in good order.

The device in accordance with the invention makes it possible to overcome the aforesaid drawback. Here, in other words, the susceptor is preferably made up of two parts which do not experience any deformation and it is the pressing which is deformed in order to flatten it (make it lie flush) against the curved parts of the diffuser base.

In accordance with the invention, there is provided a brazing press for joining a pressing having a flat bottom, a sidewall symmetrical about an axis and curved portions linking said bottom to said sidewall, to a preformed component called difuser plate which is to cover said bottom and at least a part of said curved portions, said press comprising:

a fixed frame;

at least one press jack supported by said frame;

mandrel means for supporting said pressing essentially coaxial with said sidewall thereof;

a block containing main inductor means located above and coaxially with said mandrel means, said block and said mandrel means respectively being coupled to said frame and to one of said jacks;

intermediate heating means of a ferromagnetic material, called susceptor, interposed between said block and said diffuser plate and including:

a central flat portion heated by said inductor means, and a peripheral annular portion whose internal face is arranged to match the form of the external face of the edge portion of said diffuser plate;

supplementary inductor means for heating said annular susceptor portion and surrounding said latter; and means for exerting pressure on the edges of said pressing sidewall so as to make its curved portions bulge for pressing them against the edge portion of said diffuser plate which is non-deformably supported by said susceptor means.

The invention will be better understood and other of its features and advantages will become apparent, from the following description given by way of example, and the accompanying drawings in which:

FIG. 5 is a view similar to that of FIGS. 1, 3 and 4 of a part of a third embodiment of the invention;

FIG. 6 illustrates a section along line $\overline{BB}$ of FIG. 5; and

In all these figures, similar elements have been designated by similar reference numbers.

Figure 1:
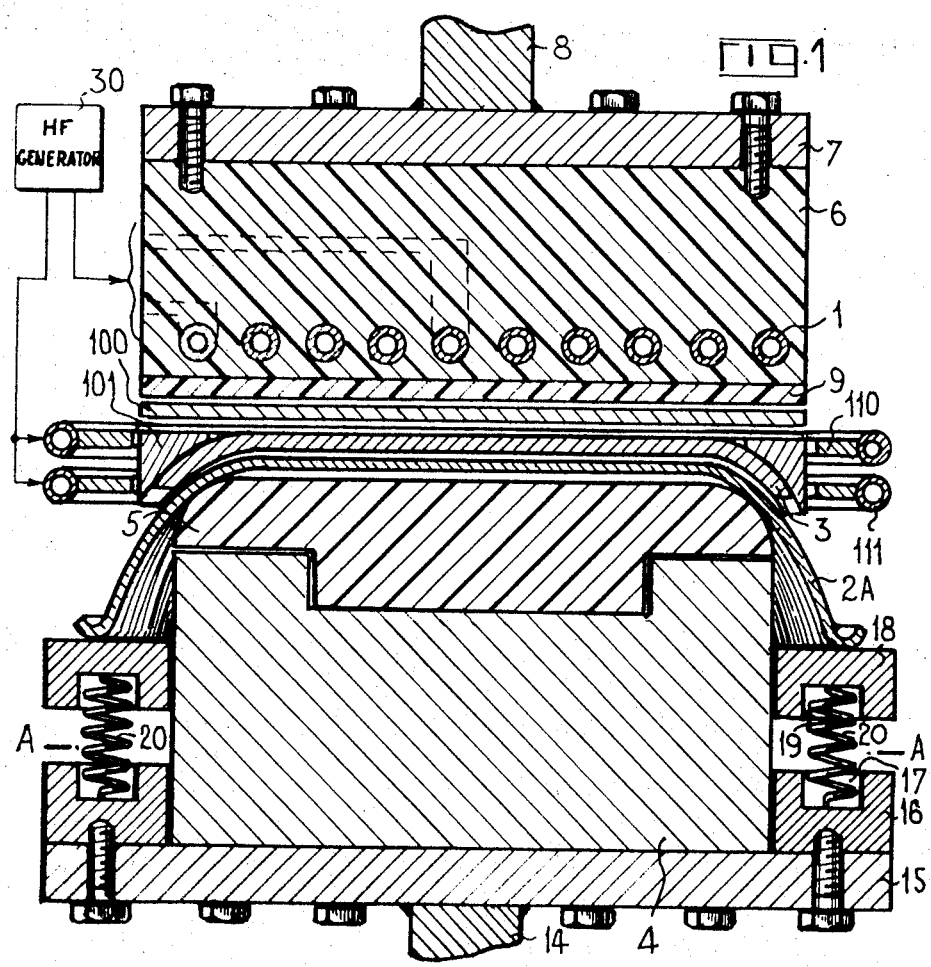
FIG. 1 shows an elevational cross-sectional view of a characteristic portion of a first embodiment of a brazing press in accordance with the invention.

In FIG. 1, the reference 1 has been used to mark the main inductor of the brazing press, by which it is possible to join together two plates, the first of which is made up by the bottom of the pressing 2A, of stainless steel for example, and the second of which is a plate made of a metal having good thermal conductivity which is to constitute a diffuser bottom 3 made of aluminium or an aluminium alloy for example. At the interface between the two elements 2A and 3 which are to be joined by brazing, a layer of brazing flux (not shown) made up from a metal alloy generally having a melting point at least slightly lower than that of aluminium or its alloy, is deposited.

The pressing 2A is supported by a mandrel made up of two portions: the first one 4 which is carried by a plate 15 attached to the rod 14 of the press jack or ram (not shown), is made of metal, and the second one 5 which comes into contact with the base of the pressing 2A whereto the diffuser bottom 3 is to be brazed, is made of a thermal insulator, that is to say a material having poor thermal conductivity, such as an asbestos-cement compound. The second component 5 of the mandrel is supported by the first 4 and substantially adopts the shape of the bottom of the pressing 2A.

The diffuser bottom 3 is preformed, that is to say that its face opposite the pressing 2A matches the shape of the latter. The inductor 1 is embedded in an insulating material (made up from a thermosetting plastic, for example) forming a block 6, carried by a metal plate 7 and by a rod 8 attached to the press frame in known manner (not shown in the figure). The inductor block 6, if not refractory, is generally protected against heating by a cold shield (not shown) and by an asbestos-cement plate 9. Because the diffuser bottom 3 carries raised edges which must also be brazed to the pressing, the press in accordance with the invention has intermediate components of a ferromagnetic material, namely susceptors 100 and 101, of special shape. The susceptor, which in the prior art is generally made up by a single plate, here has a shape matched to that of the raised curved edges of the diffuser bottom 3.

In an embodiment which has not been shown, the susceptor similar to that described by the aforesaid Patent, resembles a dinner plate or dish, its central portion being relatively thin and flat and its peripheral portion having raised edges of substantially larger thickness than the central area. The internal face of the edges of this kind of susceptor, i.e., the face located opposite the edges of the diffuser bottom 3, matches the shape of the latter in order to ensure a flush contact with the external face of the diffuser bottom. The making and utilization of this kind of susceptor is not really advantageous because such a component is relatively heavy and expensive to machine when it is made in one piece.

In the embodiments illustrated here, the susceptor is made up of two distinct components or portions:

a first one 100 in the form of a flat plate whose internal face is in contact principally with the central flat part of the external face of the diffuser bottom 3;

a second peripheral component 101, of annular form, the bottom face of which coming into contact with the raised edges of the diffuser bottom 3, follows the shape of the latter, and the top face of which is flat and contiguous with the periphery of the first component 100.

The main inductor 1, as in the afore-cited Patent, is provided simply in order to braze the flat part of the diffuser bottom 3 to the pressing 2 by heating mainly the first susceptor component 100, so that it is necessary to provide a supplementary inductor 110 surrounding the second susceptor component 101 to carry out the brazing of the raised edges of the diffuser bottom 3 to the curved part of the pressing 2, the latter curved part connecting the pressing base to its wall. This supplementary inductor 110 will here preferably be made up by a solid rectangular-section rod, of copper for example, to whose external edge there is integrally joined a tube of the same metal, 111, through which a cooling fluid flows. The supplementary inductor 110 should be located in close proximity of the annular portion 110 of the susceptor, surrounding it, in order to ensure tight coupling therewith. The shape of said supplementary inductor 110 and the intensity of the high-frequency current flowing through it, are determined in such a manner as to achieve a uniform temperature distribution over the whole of the interface between the diffuser bottom 3 and the pressing 2. This is something which can be executed either experimentally, that is to say by brazing up a number of samples and subsequently dismantling them in order to examine them, or by plotting the temperatures at said interface using for example thermoelectric transducers.

The pressing 2A (which here is a frying pan) shown in FIG. 1, comprises a central flat portion which constitutes its base, and a wall of frustoconical form connected to the bottom by curved portions which, together with the bottom, are to be joined by brazing to the diffuser bottom 3. To replace the pressure exerted upon the edges of the diffuser bottom 3, by the pivoting of the edges of the susceptor as described in the aforesaid Patent, thus pressing it against the corresponding parts of the pressing, in the present case and in accordance with the invention, the sidewall of the pressing 2A is acted upon by exerting a pressure on the edges thereof. The pressure exerted upon this wall, when the base of the pressing is already compressed by the press, between the mandrel and the inductor block, have the effect of slightly deforming the wall, that is to say spreading it away from the axis of the pressing 2A. This distorsion causes the curved parts of the pressing 2A, linking its wall to its base, to be pressed against the edges of the diffuser bottom 3, which latter cannot be deformed because it is held by the annular portion 101 of the susceptor.

This pressure on the edges of the wall of the pressing 2A is exerted here by elastic means made up by springs 20, and by an annular component 18 surrounding the portion 4 of the mandrel and carried by said springs which latter, on the other hand, bear against the plate 15 carrying said bottom portion 4 of the mandrel, by means of a second annular component 16 integral with the plate 15, for example.

Figure 2:
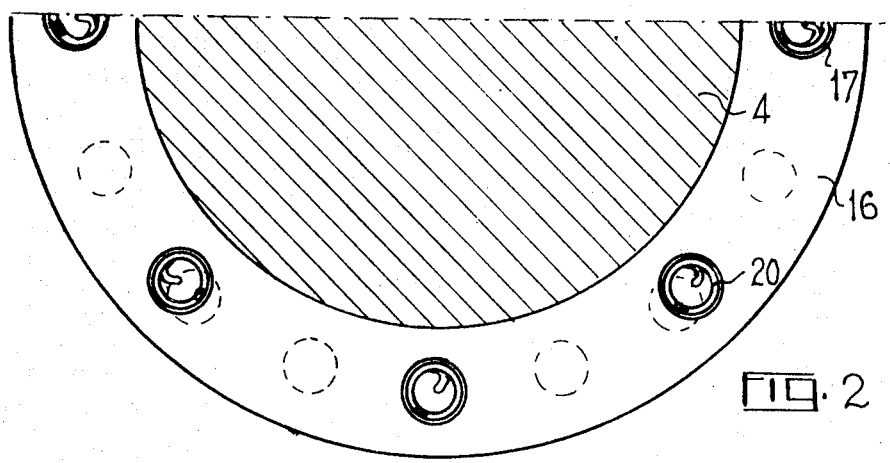
FIG. 2 illustrates a section along line $\overline{AA}$ of FIG. 1.

In FIGS. 1 and 2, elastic means constituted by a set of helical or "coil" springs 20 arranged in a circle around the portion 4 of the mandrel, symmetrically in relation to the axis thereof and located in cylindrical recesses 17 having a diameter slightly larger than that of the springs 20 and formed in the annular, fixed component 16, have been shown. The mobile annular component 18, which comes into contact with the edges of the wall, likewise contains cylindrical recesses 19 which make it possible to confine the distortion of the springs 20 to the axial direction.

In FIG. 1, the brazing press in accordance with one embodiment of the invention is shown in operation, that is to say at the stage when the jack thereof (not shown) connected to the rod 14, is thrusting the mandrel 4 and 5, towards the fixed inductor block 6 carried by the press bed (not shown).

Figure 3:
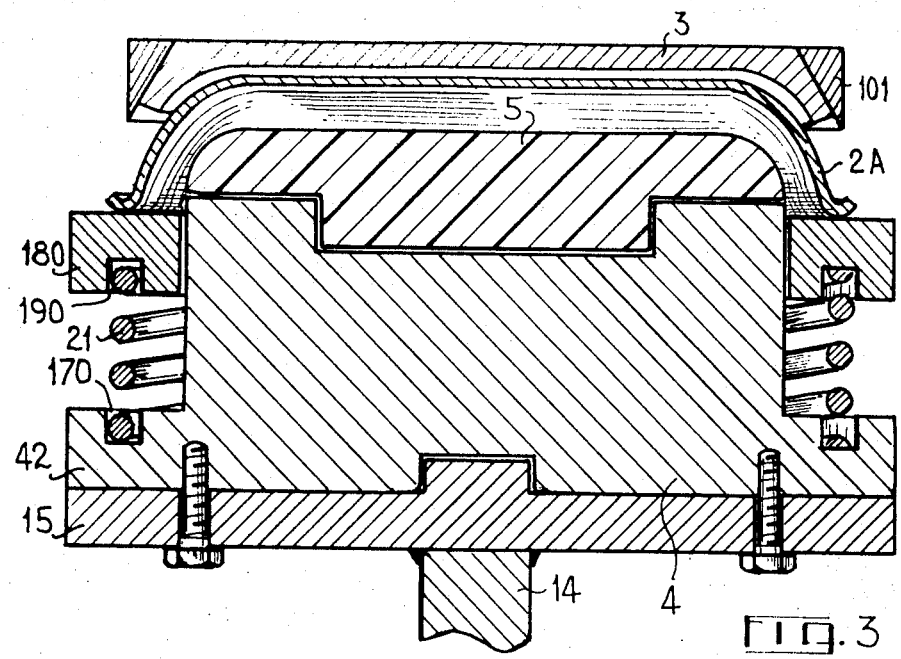
FIG. 3 is an elevational cross-section through part of a variant embodiment of the device shown in FIG. 1.

FIG. 3 illustrates a variant embodiment of the device shown in FIG. 1, in which the press is at rest, that is to say that the mandrel 4 and 5 is drawn away from the block 6 (not shown here).

In this variant embodiment, the springs 20 have been replaced by a single helical spring 21 surrounding the bottom part of the mandrel 4. The mobile annular component 180 and the portion 42 of the bottom part of the mandrel 4, which replaces the ring 16 of FIG. 1, respectively comprise annular grooves 190 and 170 for the location of the spring 21.

In this FIG. 3, it can readily be appreciated that the base of the pressing 2A, when the press is at rest, is out of contact with the top portion 5 of the mandrel but the edges of the wall are carried by the ring 180. This has the drawback that the heat stored during the earlier brazing operations, in the top part 5 of the mandrel, which is of asbestos-cement in order, prior to the operation of the press, to preheat the pressing 2A as well as the diffuser bottom 3 and likewise the brazing flux with which the pressing 2A is covered, prior to the pressing of the bottom 3 over the latter, cannot be effectively utilized.

Figure 4:
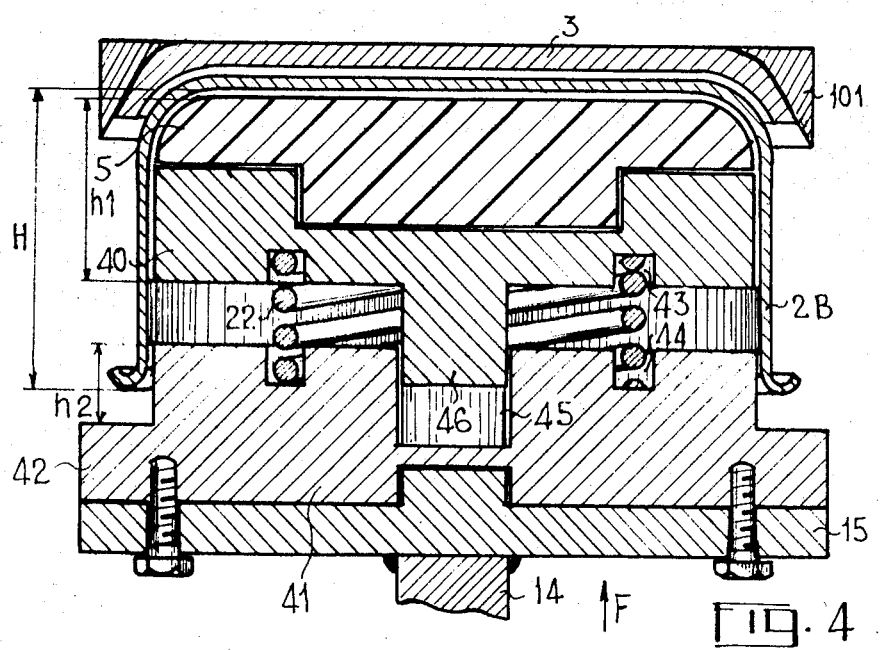
FIG. 4 is a partial cross-sectional view similar to FIGS. 1 and 2 of a second embodiment of a device in accordance with the invention.

This drawback is avoided in the embodiments of the invention which have been shown in FIGS. 4 and 5.

In FIG. 4, the pressing 2B, comprising a cylindrical or sleeve-shaped wall, is carried by the mandrel which comprises a top portion 5 of insulating material carried by the upper one 40 of two metal components 40 and 41 arranged one above the other and here constituting the bottom, metal portion of the mandrel. The bottom part 41 is fixed to and integral with the rod 14 by means of the plate 15, and carries the top piece 40, which is movable, by means of a helical spring 22 provided between the two. The spring 22 has a smaller diameter than the components 40 and 41 and its ends are seated respectively in annular grooves 43 and 44 formed in these components.

The mobile upper part 40 furthermore has a cylindrical centering rod 46 integral with it and located in a cylindrical hole 45 formed in the fixed component 41.

It will be observed here that it is likewise possible to form the hole in the moving component and to arrange for the centering rod to be integral with the fixed component.

The fixed component 41 furthermore comprises an annular part 42 completely surrounding the bottom part and having a diameter greater than that of the cylindrical wall of the pressing 2B. The top face of said annular fixed part replaces the mobile ring 18 and 180 shown in FIGS. 1 and 3, and is designed to exert a thrust on the edges of the wall when the press jack displaces the mandrel in the direction of the arrow 5 towards the fixed block 6 (not shown here).

When the press is at rest, the pressing 2B rests with its base upon the top surface of the component 5 of the mandrel, which is carried by the component 40 and the spring 22 so that the wall does not touch the annular portion 42. As soon as the press is operated, the complete mandrel carrying the pressing 2B, the diffuser bottom 3 and possibly the annular part 101 of the susceptor, all one above the other, is displaced vertically until the diffuser bottom 3 comes into contact with the fixed inductor block 6 by means of the flat portion 100 of the susceptor and the insulating plate 9 (see FIGS. 1 and 5). From this moment onwards, the spring 22 compresses and the top parts 5 and 40 of the mandrel move towards its bottom part 41, until the wall abuts against the top face of the annular portion 42 of the mandrel. The supplementary displacement of the rod 14 has the effect of exerting a thrust on the wall of compressing it relatively to its fixed base and, consequently, of slightly distorting the pressing so as to cause its curved parts, which link its wall to its base, to bulge or swell. This bulging has the effect of flattening the curved portions of the pressing against the diffuser bottom which cannot itself be distorted because it is held in its initial shape by the annular portion 101 of the susceptor. An intimate contact between the pressing 2A and the diffuser bottom 3 thus having been established over their entire interface, the inductors 1 and 110 can be fed with power from a high-frequency generator (30 in FIG. 1) in order to carry out the brazing of the bottom 3 to the pressing 2B.

The basic condition to be observed for the proper operation of this type of press is that the internal height H of the pressing wall 8 should be slightly greater than the sum of the height $h_1$ of the moving part of the mandrel and the height $h_2$ of the fixed part 41, measured from the top face of the annular mandrel part 42.

The annular portion 101 of the susceptor is generally banded to the raised edges of the diffuser bottom 3, because of the distortion of the wall under the pressure exerted on its edges. This banding generally means that an excellent bond between the bottom 3 and the pressing 2B, has been obtained. After the press has been halted, the annular portion 101 can be removed by cooling the base of the pressing from inside, for example with a fresh air blast.

FIGS. 5 and 6 illustrate a third advantageous embodiment of a brazing press in accordance with the invention, which combines the respective characteristic elements of the devices shown in FIGS. 1 and 4.

In this latter embodiment, the single helical spring 22 has been replaced by a set of coil-springs 23, similar to those, 20, of FIG. 1, each arranged upon a symmetrical pitch circle around the mandrel axis. The ends of each of these springs 23 are located in respective cavities 47 and 48 formed in the moving part 40 and the fixed part 41 of the mandrel. The pressure on the edges of the wall is exerted in this case by means of the annular component 18 surrounding the fixed part 41 of the mandrel, of the springs 20 and of the annular component 16 fixed to the plate 15 (and the rod 14), all as described hereinbefore and illustrated in FIG. 1.

This kind of design makes it possible to better gauge the pressure exerted on the wall of the pressing in relation to its base or bottom, by utilizing two sets of calibrated coil-springs 20 and 23.

It will be observed here that another substantial advantage of the embodiments illustrated in FIGS. 4 and 5, where the mandrel comprises a mobile part 40, over those of FIGS. 1 and 3, is the fact that the flat base of the pressing is subjected to pressure before the pressing is deformed by the pressure applied to the edges of its wall, thus limiting to a minimum any unwanted displacements of the pressing base in relation to the diffuser bottom, which may be the source of poor brazed joints.

Figure 7:
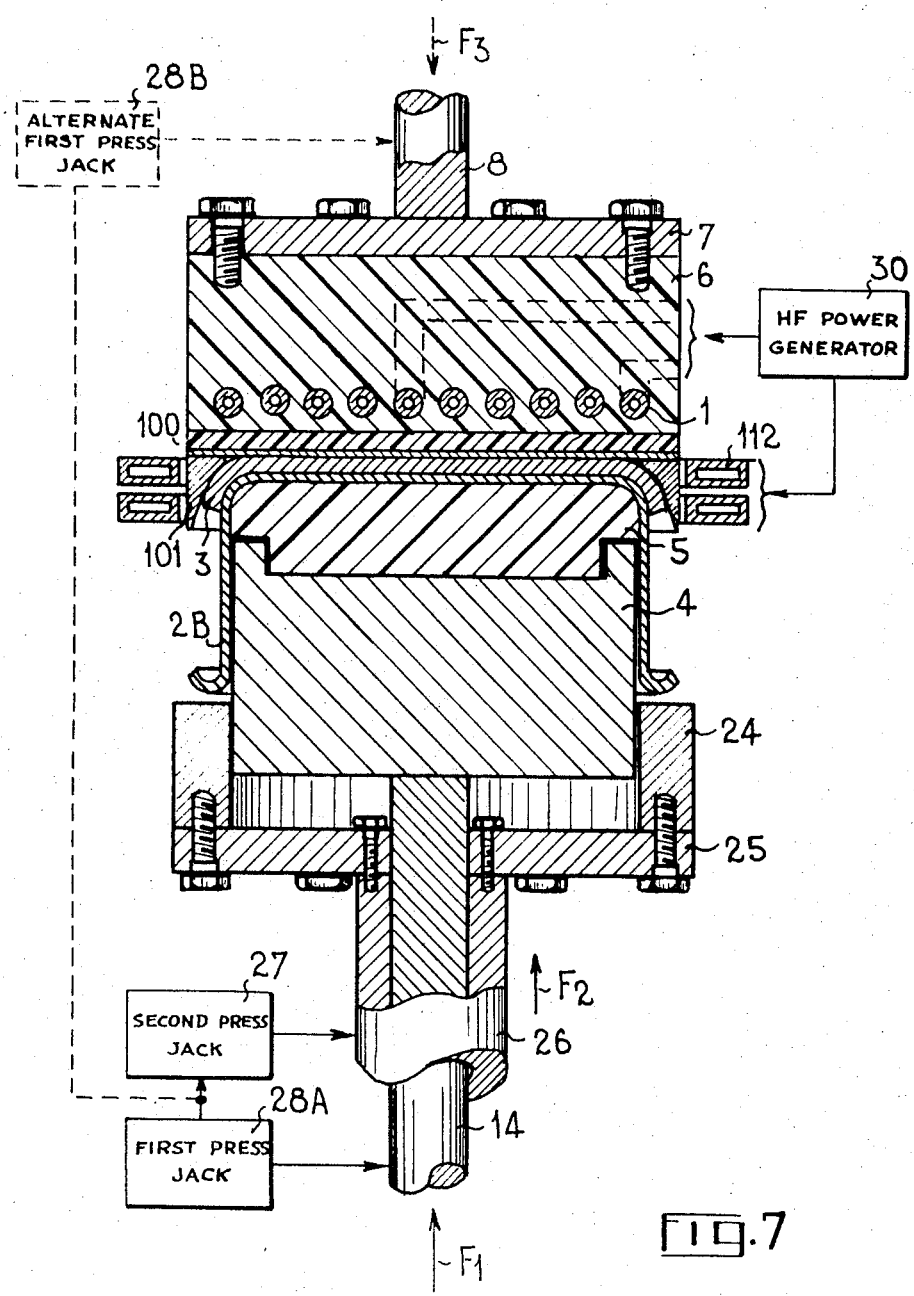
FIG. 7 shows an elevational cross-sectional view of a part of the preferred embodiment of a device in accordance with the invention with some elements shown schematically.

The preferred embodiment of the brazing press in accordance with the invention has been illustrated in FIG. 7. This embodiment is particularly suitable for pressings whose thicknesses and/or dimensions are larger, where the force exerted on the edges of the wall has to be high and where that produced by the springs is insufficient to produce the desired deformation of the curved portions of the pressing. A product of this kind, for example, would be a utensil such as a pressure-cooker, these having to withstand substantial vapour pressures without distortion.

In FIG. 7, the means used to exert the pressure on the edges of the wall of the pressing 2B, comprise a metal component of hollow cylindrical form, 24, surrounding the bottom part 4 of the mandrel carried by the rod 14 and movable in relation thereto. This component 24 is connected to a second press jack 27 by means of a plate 25 and a second rod 26, which is here in the form of a cylindrical tube surrounding the first rod 14 fixed to the mandrel 4, 5.

The first jack of the press 28A is, preferably, coupled to the first rod 14 and controls the displacement of the latter and, consequently, that of the mandrel, in the direction of the arrow $F_1$, whilst the second jack 27 is coupled to the second rod 26 in order to control the displacement of the latter and that of the cylindrical component 24 which acts upon the edges of the wall of pressing 2B in the direction of the arrow $F_2$, the rod 8 carrying the inductor block 6 being fixed in relation to the press bed or frame.

In a variant of this embodiment, illustrated in broken line, the first jack 28B of the press is coupled to the rod 8 in order to displace the latter along with the inductor block 6, in the direction of the arrow $F_3$, whilst a rod 14 carrying the mandrel is fixed in relation to the frame.

The control system for the second jack 27 is coupled to an element of the first one 28, in order that it is preferably actuated only when the latter has reached the end of its travel. This is something which can readily be achieved, for example with the help of a contact which is operated when the mandrel comes into contact with the inductor block, this contact producing the control signal for the second ram 27. It is equally possible to use a delay device in order to delay the control signal applied to the second ram 27 in relation to that applied to the first one 28.

The operation of this embodiment of the brazing press in accordance with the invention, is as follows:

when the pressing 2B is placed on the mandrel and is resting with its base upon the top face of the component 5 made of asbestos-cement, there is positioned on the pressing 2B the diffuser bottom 3 and then the peripheral part 101 of the susceptor on top of the latter, the space between the pressing 2B at the diffuser bottom 3 containing brazing flux;

subsequently, the first jack 28A or 28B is operated to compress the components 2B and 3 which are to be brazed together and the susceptor 100 and 101, between the mandrel 4, 5 and the inductor block 6; and finally, as soon as the first jack 28A or B as the case may be, has reached the end of its travel, the second one 27 is operated so that the top face of the tubular component 24 comes into contact with the edges of the wall of the pressing 2B and exerts a substantial pressure on said wall in order to produce a slight bulging of the curved part thereof and thus establish an intimate contact with the diffuser bottom during the period of brazing.

It should be noted here that the double-acting presses utilized in this embodiment are well known per se as also are the double-acting jacks employed therein.

It should be pointed out too, that with regard to FIG. 7, the supplementary inductor 112 provided for the induction heating of the annular peripheral component 101 of the susceptor can equally well be made from a rectangular-section tube.

The brazing press in accordance with the embodiments described hereinbefore is applicable principally to the manufacture of cooking vessels (frying pans — pressing 2A or casserole dishes — pressing 2B), which comprise a solidly bonded assembly between a stainless steel body and a heat diffuser bottom of aluminum or copper.

What is claimed, is:

1. Brazing press for joining a pressing having a flat bottom, a sidewall symmetrical about an axis and curved portions linking said bottom to said sidewall, to a preformed component called diffuser plate which is to cover said bottom and at least a part of said curved portions, said press comprising:
    a fixed frame;
    at least one press jack supported by said frame;
    mandrel means for supporting said pressing, essentially coaxial with said sidewall thereof;
    a block containing main inductor means located above and coaxially with said mandrel means, said block and said mandrel means being respectively coupled to said frame and to one of said jacks;
    intermediate heating means of a ferromagnetic material, called susceptor, interposed between said block and said diffuser plate and including:
        a central flat portion heated by said inductor means, and
        a peripheral annular portion whose internal face is arranged to match the form of the external face of the edge portion of said diffuser plate;
    supplementary inductor means for heating said annular susceptor portion and surrounding said latter;
    and means for exerting pressure on the edges of said pressing sidewall so as to make its curved portions bulge for pressing them against the edge portion of said diffuser plate which is non-deformably supported by said susceptor means.

2. Press as claimed in claim 1, wherein said susceptor means are composed of two separate parts and comprise:
    a first flat, plate-shaped part making up said central portion; and
    a second, annular, peripheral part whose lower face matches the shape of the external face of the raised edge portion of said diffuser plate and whose top face is flat, making up said peripheral portion.

3. Press as claimed in claim 1, of the type including a single press jack, wherein said means for exerting pressure comprise:
    first elastic means supported integrally with said mandrel means and arranged around said latter; and
    a movable first annular component surrounding said mandrel means and carried by said first elastic means for displacement in parallel to said axis, whereby the top face of said first annular component comes into contact with said sidewall edges for exerting said pressure thereon.

4. Press as claimed in claim 3, wherein said first elastic means comprise a set of coil-springs disposed symmetrically about said axis.

5. Press as claimed in claim 3, wherein said first elastic means comprise a single helical spring surrounding said mandrel means and disposed substantially coaxially with said axis.

6. Press as claimed in claim 3 wherein said mandrel means comprises:
    a bottom part fixed in relation to said jack;
    second elastic means carried by said bottom part; and
    a top part axially movable in relation to said bottom part and supported by said second elastic means, said mobile top part carrying the pressing by its bottom, whereby said mobile annular component carried by said first elastic means exerts a pressure on the edge of said sidewall, whilst said top part exerts a pressure upon said pressing bottom.

7. Press as claimed in claim 6, wherein said second elastic means comprise a single helical spring whose diameter is less than that of the mandrel and which is disposed substantially coaxially thereto and is carried by said bottom part.

8. Press as claimed in claim 6, wherein
said second elastic means comprises a set of coil-springs disposed symmetrically in relation to the axis of said mandrel means on a pitched circle of diameter less than that of said mandrel means, and carried by the bottom part thereof.

9. Press as claimed in claim 1 of the type including a single jack, wherein said mandrel means comprises:
a bottom part fixed in relation to said jack;
second elastic means supported by said bottom part;
a top part axially movable in relation to said bottom part and carried by said second elastic means, said top part supporting the pressing by its base; and
wherein said pressure exerting means comprises:
a second annular component integral with said bottom part and having a diameter larger than that of the edges of said sidewall, whereby the top face of said second annular component comes into contact with said sidewall edges for exerting said pressure thereon, whilst said top part presses against said pressing bottom.

10. Press as claimed in claim 1, of the double-acting type, comprising first and second jacks the first of which is coupled either to the mandrel or to the inductor block, wherein said pressure exerting means comprise a cylindrical tube-shaped component surrounding and coaxial with said mandrel means and having a mean diameter approximately equal to that of said sidewall, and a thickness greater than the latter, said tubular component being mechanically coupled to said second jack so as to exert a thrust on the edges of said sidewall in the direction of said pressing bottom.

11. Press as claimed in claim 10, wherein said second jack is operated with a predetermined delay in relation to the first jack.

12. Press as claimed in claim 11, wherein said second jack is operated as soon as said first one arrives at the end of its travel.

13. Press as claimed in claim 1, wherein said supplementary inductor means surrounding the annular peripheral portion of the susceptor comprises a conductor of rectangular cross-section and a tube of circular section integrally joined to the exterior of said rectangular conductor for passing a cooling fluid.

14. Press as claimed in claim 1 characterized in that said supplementary inductor takes the form of a rectangular section tube.

* * * * *